(No Model.)
J. HECK.
ATTACHMENT FOR PLOWS.
No. 304,819. Patented Sept. 9, 1884.
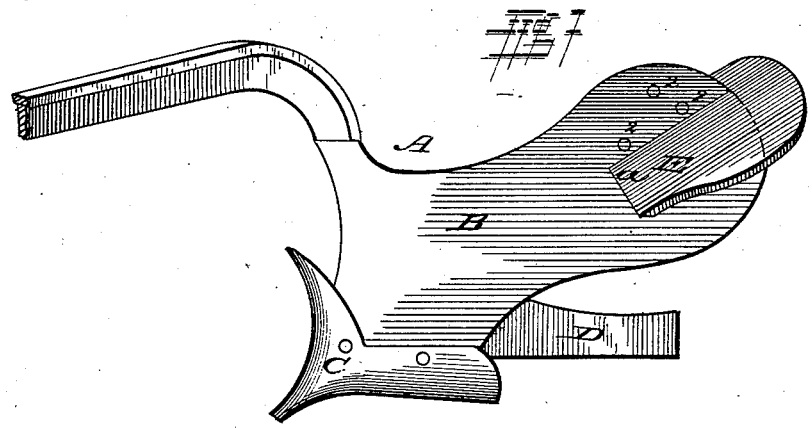
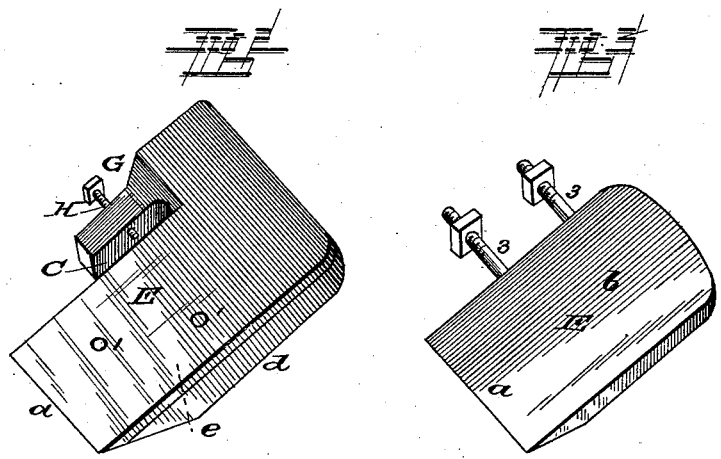
WITNESSES:
Fred. G. Dieterich.
Albert E. Dieterich.
INVENTOR,
Joshua Heck
By J. J. Johnston
ATTORNEY.

United States Patent Office.

JOSHUA HECK, OF UNITY, COLUMBIANA COUNTY, OHIO.

ATTACHMENT FOR PLOWS.

SPECIFICATION forming part of Letters Patent No. 304,819, dated September 9, 1884.

Application filed May 16, 1884. (No model.)

*To all whom it may concern:*

Be it known that I, JOSHUA HECK, of Unity township, in the county of Columbiana and State of Ohio, have invented a new and useful Improvement in Attachment for Plows; and I do hereby declare that the following is a full, clear, and exact description thereof, reference being had to the accompanying drawings and the letters of reference marked thereon.

My invention has for its object the construction of a cheap, simple, and efficient detachable attachment for plows for subsoiling or recutting and turning the soil as it moves upon the mold-board of the plows in the operation of plowing.

My invention consists in the construction and adaptation of a removable attachment consisting of a secondary share and mold-board adapted to be secured to the mold-board of any known construction of plows having a mold-board.

To enable others skilled in the art with which my invention is most nearly connected to make and use my invention, I will proceed to describe its construction and operation.

In the accompanying drawings, which form part of this specification, Figure 1 is a perspective view of my improvement in a detachable attachment for plows as applied to mold-boards of plows. Fig. 2 is a perspective view of said detachable attachment for plows. Fig. 3 represents in perspective view a modified construction of my improvement in detachable attachments for plows.

In the accompanying drawings, A represents an ordinary plow having a mold-board, B, share C, and landside D.

To the mold-board B is attached the detachable attachment E, having a limb, G, provided with a set-screw, H.

Between the limb G, share or cutter $a$, and mold-board $b$ of the detachable attachment E is a recess, $c$, into which enters the mold-board B of the plow A, as shown in Fig. 1. The detachable attachment E is secured to the mold-board B through the medium of the set-screw H, and may be set with relation to the mold-board at any desired angle. The cutting-edge of the share of the detachable attachment E may be at about the angle indicated by the dotted line 4 in Fig. 2, and said attachment may be constructed in a single piece, as shown in Figs. 1 and 3, or in two parts, as shown in Fig. 2, in which face-plate $e$ is secured to the back plate, $d$, by means of rivets, (marked 1.)

The modified construction of the attachment shown in Fig. 3 is provided with screw-bolts and nuts, (marked 3,) which screw-bolts enter the opening 2 in the mold-board B of the plows A, and the attachment may be drawn firmly against and held rigidly to the mold-board through the medium of the nuts of the screw-bolts 3; but preference is given to the construction of the attachment shown in Figs. 1 and 2.

It will be apparent that the attachment hereinbefore described can be adapted for and attached to both right and left hand plows.

The operation of my improvement is as follows: The plow A plows up the ground in the usual manner, which moves up and turns on the mold-board in the ordinary way, and as the soil moves up the mold-board B and becomes inverted the share $a$ of the attachment E enters the soil, cutting and dividing it, and the under or subsoil side of the furrow passes above the secondary share and drops into the open furrow behind the mold-board and turns the remainder in the usual manner.

Having thus described my improvement, what I claim as of my invention is—

In combination with the mold-board of a plow, the detachable secondary share or mold-board E, placed obliquely as to the line of draft, and projecting outward from the mold-board at substantially a right angle, all as shown and specified.

JOSHUA HECK.

Witnesses:
JAMES J. JOHNSTON,
EDWARD S. JOHNSTON.